United States Patent [19]

Miller et al.

[11] Patent Number: 5,066,628

[45] Date of Patent: Nov. 19, 1991

[54] CATALYST AND PROCESS FOR HIGH SELECTIVITY REFORMING WITH PT/RE ON BA-K-L ZEOLITE

[75] Inventors: Jeffrey T. Miller; Victor K. Shum, both of Naperville, Ill.

[73] Assignee: Amoco Corporation, Chicago, Ill.

[21] Appl. No.: 528,038

[22] Filed: May 23, 1990

Related U.S. Application Data

[62] Division of Ser. No. 287,397, Dec. 20, 1988, Pat. No. 4,954,245.

[51] Int. Cl.$^5$ .......................... B01J 29/30; B01J 29/36
[52] U.S. Cl. .......................................... 502/66; 502/74
[58] Field of Search ..................................... 502/66, 74

[56] References Cited

U.S. PATENT DOCUMENTS 4,416,806  11/1983  Bernard et al. ........................ 502/74

Primary Examiner—Carl F. Dees
Attorney, Agent, or Firm—Reginald K. Taylor; William H. Magidson; Ralph C. Medhurst

[57] ABSTRACT

This invention comprises a reforming catalyst and process with an unsulfided catalyst comprising Zeolite L, in which the cationic sites have been exchanged to contain potassium or barium or both; a Group VIII noble metal and rhenium, where the ratio of noble metal to rhenium is from about 0.1:1 to about 10:0. This catalyst gives improved selectivity toward aromatics formation and has improved sulfur tolerance compared to other L zeolite reforming catalysts.

5 Claims, No Drawings

CATALYST AND PROCESS FOR HIGH SELECTIVITY REFORMING WITH PT/RE ON BA-K-L ZEOLITE

This is a division, of application Ser. No. 287,397, filed Dec. 20, 1988 now U.S. Pat. No. 4,954,245.

BACKGROUND

This invention relates to an improved process for reforming of paraffins to aromatics which uses a catalyst comprising L zeolite a Group VIII noble metal, and rhenium. The ratio of Group VIII noble metal to rhenium is from about 0.1:1 to about 10:1. The unsulfided catalyst of this process shows improved catalyst life, better sulfur tolerance and improved product selectivity compared to known L-zeolite catalysts.

Catalytic reforming is used in the petroleum industry for converting paraffins to aromatic hydrocarbons. This reaction can be used, for example, for increasing the octane of gasolines, or producing aromatic feedstocks for chemical or plastics industries. Typically in this process, the naphtha is passed over a suitable catalyst under reforming conditions. The process involves several types of reactions, including isomerization, dehydrocyclization of paraffins to produce naphthenes and aromatics, dehydrogenation of cyclohexanes and other naphthenes and alkanes, isomerization or dehydrogenation of cyclopentanes, isomerization of normal paraffins to isoparaffins, and hydrocracking. The most important reforming reactions are those which produce aromatics, particularly dehydrocyclization. It is the increased aromatics content which increases the octane value of naphtha to make it a useful gasoline blending component. Conventional reforming catalysts contain a noble metal, usually platinum, on an inorganic oxide carrier material such as silica, alumina or silica-alumina. Natural or synthetic zeolites such as mordenite, X, Y, and L have also been used. Catalysts available commercially use gallium, rhenium, tin, iridium, and other metals to alter the properties of reforming catalysts in specific ways.

The addition of rhenium to conventional platinum reforming catalysts is well known and well documented. Rhenium addition substantially increases catalyst life in the reforming process, allowing longer run times between shutdowns, less money spent on catalyst and/or higher severity operations. Typically, when added to conventional non-zeolite, noble metal reforming catalyst, rhenium has no effect on the catalyst selectivity, but it does reduce the effects of catalyst deactivation. It also makes the catalyst more sensitive to sulfur poisoning. The advantages of the lower deactivation rate can be negated by the sulfur poisoning effects when the feedstock sulfur levels exceed a few parts per million.

The addition of rhenium to conventional reforming catalysts also necessitates the use of special start-up procedures. Fresh platinum-rhenium catalysts have extremely high initial activity, and result in very low amounts of liquid products unless steps are taken to limit the catalyst activity. Conventional platinum-rhenium catalysts need to be presulfided prior to use in a reforming process. For example, presulfiding Pt/Re on alumina catalysts is discussed in Shum, V. K., Butt, J. B. and Sachtler, W. M. H. "The Effects of Rhenium and Sulfur on the Activity Maintainence and Selectivity of Platinum/Alumina Hydrocarbon Conversion Catalysts" Journal of Catalysis Vol. 96, 1985, pp. 371-380. The authors state "The initial activity of the sulfided catalyst is lower than that of the unsulfided catalyst, as should be expected, because of the poisoning effect of sulfur. It is most remarkable, however, that the sulfided catalyst displays a much smaller activity decline so that this catalyst shows a higher total conversion after several hours of reaction and retains this superior activity for the duration of our experiments." It is believed that the fresh catalyst is so active that it needs to be temporarily poisoned to reduce undesirable reactions until some coke buildup on the catalyst moderates the activity. In practice, it is very difficult to achieve the exact amount of sulfur addition to reduce the initial activity surge without doing other damage to the catalyst. Insufficient sulfur does not adequately suppress the hydrogenolysis reactions. Excess sulfur poisons the catalyst for a longer time than necessary, or it washes onto catalyst of other reactors causing them to lose activity as well. Presulfiding is normally accomplished by passing a gaseous stream comprising hydrogen sulfide over the catalyst bed before the hydrocarbon feedstock is introduced. Often this is done in-situ, when the catalyst has been loaded into the reactor, but before the reactor is put on stream. The presulfiding step can also be done as a separate step, before the catalyst is loaded into the reactor. Conventional platinum-rhenium catalysts are always presulfided before introduction of the catalyst feedstock. In a cyclic process where the catalyst can be regenerated as often as every 3-4 days, presulfiding has been used with each reactor as it is put back on stream to control unwanted reactions as the feedstock is introduced.

Zeolite L is well known in the patent literature as a reforming catalyst. U.S. Pat. No. 4,634,517, issued to Tauster et al., claims a process for reforming hydrocarbons which uses a catalyst comprising zeolite L in which 75% of the exchangeable cations are from a group including potassium and barium. The catalyst also contains a Group VIII noble metal which is finely dispersed over the catalyst surface. This reference teaches that rhenium could be added to the catalyst if a noble metal is present. The reference contains no data or teachings as to what the effect of the rhenium addition would have, if any. The reference also teaches that introducing a small amount of sulfur to the catalyst is desirable to minimize the hydrocracking reactions that are present at the beginning of the reaction.

Potassium exchanged Zeolite L is claimed in a dehydrocyclization process in U.S. Pat. No. 4,614,834, issued to Lambert et al.. The process is carried out under reforming conditions. The catalyst contains platinum or another Group VIII metal component. This reference also teaches that metal components known to have modifying properties, including rhenium, may be added to the catalyst. Again there are no data or examples which show the use of rhenium to demonstrate what effect, if any, addition of rhenium to this catalyst composition may produce.

U.S. Pat. No. 4,456,527 discusses how a lack of stability due to sulfur sensitivity is a particular problem with catalysts comprising large-pore zeolites, such as L zeolite. The sulfur levels required when using such a catalyst are an order of magnitude or more below the levels permissible for even the most sulfur-sensitive conventional reforming catalysts. This reference suggests several alternatives for reducing the feedstock sulfur level to the 500 parts per billion level, but none include modifications to the catalyst itself.

Improved sulfur tolerance is accomplished by Pandey et al. in U.S. Pat. No. 4,680,280 by the addition of a desulfurization metal to a reforming catalyst comprising zeolite L and platinum. A platinum-molybdenum on Zeolite L catalyst is shown to have longer catalyst life compared to a non-molybdenum-containing catalyst. These catalysts were tested, however, at a feedstock sulfur level of only 0.2 ppm, or less than half the sulfur level recommended for Pt/Zeolite L catalysts.

Poeppelmeier et al., in U.S. Pat. No. 4,648,960 disclose a reforming process which uses a catalyst comprising a binder, a type L zeolite, exchangeable cations and a Group VIII noble metal, where the noble metal is well dispersed over the surface of the catalyst and the particles containing the noble metals are less than 7 Angstroms in diameter. This patent also contains a broad teaching that rhenium may be present, but there are no examples demonstrating the use of rhenium, nor are there teachings as to what amount of rhenium are useful.

In U.S. Pat. No. 4,595,670, Tauster et al. claim a catalyst comprising a type L zeolite, a Group VIII metal, with good dispersion of the noble metal and noble metal-containing particles of less than 7 Angstroms in diameter. Again, there is a teaching that rhenium can be present, but there are no examples on its use. There are no teachings as to what level of rhenium is useful.

A dehydrocyclization process is claimed by Lambert et al. in U.S. Pat. No. 4,746,764, which uses a catalyst comprising a type L zeolite, a Group VIII noble metal, and a surface deposited alkali metal with an alkali metal index of from 40 to 500, and which is made without subjecting the L zeolite to a pH greater than 9. This patent also contains a teaching that metals known to modify reforming catalysts, rhenium is listed, may be used in the invention. It is taught that "catalytically effective amounts of such modifiers" can be used in the invention. There are no examples containing rhenium to demonstrate a "catalytically effective amount".

U.S. Pat. No. 4,448,891, issued to Cohen, claims a catalyst for reforming produced by soaking a type L zeolite prior to calcining the dehydrocyclization metal-loaded zeolite in an alkali solution having a pH of at least 11. This patent also lists common metals used to modify reforming catalysts, such as rhenium, tin, iridium or germanium. There are no operating examples using rhenium, nor any teaching of the amount to be used.

DESCRIPTION OF THE INVENTION

As stated above, the use of rhenium in conventional reforming catalysts is well known. In traditional catalysts, three things are known concerning the effect of rhenium addition on catalyst behavior. First, the addition of rhenium has no effect on the selectivity of the reforming catalyst. That is to say that it gives the same proportions of products as the platinum catalyst. For the same level of conversion, the Pt/Re catalyst gives the same product distribution and same product octane as the platinum catalyst. Secondly, the addition of rhenium to a conventional $Pt/Al_2O_3$ catalyst gives the catalyst slower deactivation rates. There has been no evidence that the Pt/Re combination reduces the formation of coke, but apparently the catalyst is able to function better in spite of the coke buildup. Finally, the addition of rhenium makes the catalyst more sensitive to sulfur poisoning. Conventional platinum catalysts show no effect with sulfur levels up to 10 ppm sulfur. With a Pt/Re catalyst however, both activity and product yields are reduced rapidly when 10 ppm sulfur is present in the feed. It is recommended, however, that sulfur be reduced to 1 ppm for Pt/Re catalysts.

The prior art also teaches that L Zeolite reforming catalysts act differently than conventional platinum catalysts. L Zeolite is a large pore zeolite that, because of the size of the channel structure, has different selectivity than conventional catalysts. The L Zeolite has very high selectivity for producing aromatics from light paraffins in the $C_6$–$C_8$ range. The catalyst is monofunctional, that is, all of the chemical reactions take place at the metal site. On a conventional reforming catalyst, reactions take place at both metal sites and acid sites.

However, Pt/L Zeolite catalysts are also extremely sulfur sensitive. L Zeolite catalysts deactivate rapidly at levels between 1 and 10 ppm feedstock sulfur, where traditional catalysts are used. Recommended sulfur levels of less than 0.5 ppm are needed to get reasonable deactivation rates from these catalysts.

From the prior art, one skilled in the art might expect that the addition of rhenium to an L Zeolite reforming catalyst might result in a catalyst with even greater sulfur sensitivity. In addition, presulfiding the rhenium catalyst, as taught in the art, is at best a very difficult process to get the exact amount of sulfur on a sulfur-sensitive catalyst.

It is therefore surprising to those skilled in the art that all other things being equal, rhenium added to a Pt/Zeolite L reforming catalyst has improved aromatic selectivity. Since rhenium is known to reduce sulfur tolerance, it is also surprising that the rhenium addition improves the catalyst's tolerance to sulfur during conversion of paraffins to aromatics.

Briefly this invention comprises reforming with an unsulfided catalyst comprising Zeolite L, in which the cationic sites have been exchanged to contain potassium or barium or both; a Group VIII noble metal and rhenium, where the ratio of noble metal to rhenium is from about 0.1:1 to about 10:0. This catalyst gives improved selectivity toward aromatics formation and has improved sulfur tolerance compared to other L zeolite reforming catalysts.

"Unsulfided" catalyst is intended to mean catalyst that has been precluded from contact with sulfur or sulfur compounds prior to the catalyst's introduction to the hydrocarbon feedstock. It is understood that once the hydrocarbon feedstock is fed to the catalyst bed, some trace sulfur compounds in the feedstock are deposited on the catalyst surface. This type of sulfiding is not relevant to this invention.

Type L zeolites are large pore zeolites having an effective pore diameter of about 6 to 15 Angstroms and a distinct hexagonal crystal structure. The characteristic x-ray diffraction pattern is shown in Table A.

TABLE A 16.1 ± 0.3
7.52 ± 0.04
6.00 ± 0.04
4.57 ± 0.04
4.35 ± 0.04
3.91 ± 0.02
3.47 ± 0.02
3.28 ± 0.02

3.17±0.01
3.07±0.01
2.91±0.01
2.65±0.01
2.46±0.01
2.42±0.01
2.19±0.01

The general formula for L zeolites is:

$$0.9-1.3 M_{2/n}O:Al_2O_3:xSiO_2:yH_2O$$

where M designates at least one exchangeable cation, n represents the valence of M, y is any value from 0 to about 9, and x, the silica to alumina ratio, can be from 2 to about 50. The structure results in channels approximately cylindrical in shape, and of sufficient diameter that paraffins of 6 to 8 carbon atoms in length can easily diffuse into and out of the channels to participate in chemical reactions. A binder can be added to the L zeolite to give additional physical strength. The L zeolite is then modified by ion exchanging the cationic sites so that they contain species from the group consisting of barium and potassium. The Group VIII metal and rhenium are also added to the L zeolite.

The L Zeolite used in this invention must be rendered non-acidic by exchanging all of the cationic sites, M, with non-hydrogen ions. Exchanging the hydrogen ions for those of another cationic species is well known in the art, and any of these processes can be used to exchange the L Zeolite. Preferred non-hydrogen cations include metals in Group IA or Group IIA of the Periodic Table of the Elements or combinations thereof. Especially preferred are the heavier metals such as cesium, rubidium, potassium, barium, strontium or calcium. After ion exchanging the zeolite, it is washed to remove the excess ions remaining in the pores of the zeolite.

It is also contemplated that the nonacidic L Zeolite may be intimately associated with a nonacidic support matrix. Preferred matrix material is silica, although a nonacidic alumina, magnesia, boria, zirconia, beryllia, vanadium oxide, cesium oxide, thoria, or combinations can be used. If a support matrix is used to bind the nonacidic L Zeolite, the procedure for binding may be by any method known in the art.

Another essential feature of this catalyst is the presence of a Group VIII noble metal, such as platinum or palladium. Platinum is the preferred metal for this invention, and can be added to the zeolite by any known means, including ion exchange or impregnation. Impregnation is the preferred method because it is easier to control the exact amount of the metal salts added. Solutions of $Pt(NH_3)_4(NO_3)_2$ or $Pt(NH_3)_4Cl_2$ are preferred over chloroplatinic acid. The catalyst is dried following the addition of the platinum. Platinum catalyst are often chlorided. Chloride can be added to the catalyst of this invention, but is not necessary.

The rhenium component should be added in a separate step. Mixing of the platinum and rhenium salts causes a precipitate to form, changing the proportions of the ions in the solutions. Ion exchange techniques can be used, but impregnation is the preferred method for depositing the rhenium onto the L Zeolite. Any suitable rhenium compound can be used as the source of rhenium, such as ammonium perrhenate ($NH_4ReO_4$), perrhenic acid ($HReO_4$) or rhenium carbonyl ($Re_2(CO)_{10}$).

Levels of the Group VIII noble metal plus rhenium should range from 0.1 to 5 weight percent of the total weight, based on the weight of the sieve, or sieve plus matrix if matrix material is used. Preferably, the weight of the metals should be from 0.3% to 2.5 weight %, and more preferably from 0.5% to 1.5% by weight. The ratio of noble metal to rhenium should be in the range of 0.1:1 to 10:1, most preferably in the range of 0.5:1 to 2:1.

After the metals have been placed on L zeolite (and support matrix material, if present), the catalyst should be dried and calcined. Calcining temperatures less than 550° F. are preferred for a period of about 0.1 hours to about 3 hours.

The catalyst of this invention can be used to treat a light paraffinic feedstock for conversion to aromatics. The feedstock is a naphtha boiling range material, from about 50° F. to about 425° F., comprising paraffins and naphthenes. Process conditions include temperatures in the range of from 500° F. to 1450° F., pressures from atmospheric to about 1500 psig, liquid hourly space velocities from 0.2 to about 15 $hr^{-1}$.

Treating of such a feedstock can be carried out as a separate process or as part of a traditional catalytic reforming process. In a reforming process with a full range feed, when the feed reaches the last fraction of the catalyst, most of the naphthenes have already been converted to aromatics. Use of this specialized process in the last portion of the reactor bed can convert the remaining paraffins with higher activity and selectivity than the standard reforming catalyst. It is contemplated that a more traditional catalyst, such as platinum on alumina, can additionally be used in this process. The platinum on alumina can be used in the first 10 to 50% of the catalyst bed where the predominant reaction is the dehydrogenation of naphthenes to aromatics. This traditional catalyst is less expensive than the zeolite-containing catalyst, but is equally active in dehydrogenation of naphthenes, which are easy to convert. The L zeolite containing catalyst can be used in the remainder of the catalyst bed to then convert the paraffins.

A preferred use of this process is as a separate process for converting a stream comprising primarily light paraffins. The heavy aromatics present in the conventional reformer cannot be improved by this process, and can make coke. As a stand alone process, aromatics can be removed from the feedstock before introducing it to this process. The lighter aromatics produced have less of a tendency to form coke, and the life of the catalyst is prolonged. This process is especially attractive when used with some of the narrow cut feedstocks which are primarily $C_6-C_8$ paraffins. A process such as this is very useful in a recycle loop with an aromatics extraction step, for the production of high quality aromatics for high octane gasoline blending components or chemicals production.

Use of this invention is not limited to any particular aromatization process or configuration. The process should work equally well as a fixed bed, fluidized bed or moving bed process. Popular reforming processes include semi-regenerative reforming, wherein temperatures are raised in a fixed bed process to maintain activity as the catalyst becomes coked. In cyclic reforming, several catalyst reactors are used in series. As the catalyst becomes coked it is replaced with a swing reactor and taken off line to be regenerated. The conversion zone may contain one or more separate reactors. Due to the endothermic nature of the dehydrocyclization reaction that takes place in the catalyst bed, heating means may be necessary between catalyst beds to maintain suitable reaction temperatures. Reactants may be contacted in either upflow, downflow, or radial flow, or as liquid, vapor or mixed vapor/liquid phases. Best results are obtained when all reactants are in the vapor phase.

Process conditions are those typical for dehydrocyclization reactions. Temperatures and pressures should be adjusted to produce the degree of conversion desired. Generally, these conditions include a temperature of about 500° F. to 1450° F., a pressure of from 0 psig to about 1500 psig, a liquid hourly space velocity (calculated as the liquid volume of the charge stock per hour divided by the volume of the catalyst bed) of about 0.2 to 15 hr$^{-1}$. Preferred conditions include reactor temperatures from about 700° F. to 1100° F., reactor pressures of 0 to 400 psig and space velocities from about 1 to about 5 LHSV. Especially preferred conditions include temperatures from 875° F. to 975° F. and pressures from 50 to 150 psig. Furthermore, hydrocarbon conversion may include the presence of a diluent such as hydrogen. When this is the case, the hydrocarbon mole ratio may be from 0.5:1 to about 30:1.

Suitable feedstock to this process is a hydrocarbon stock in the naphtha boiling range, which comprises primarily paraffins and naphthenes, although some aromatics and olefins may be present. The naphtha feedstock may be a full-boiling-range naphtha having an initial boiling point of from about 50° to about 150° F. and an end point of from 325° to about 425° F. More narrow cut feedstocks, which are equally or more suitable for this process, can have a boiling range which is only a fraction of the full-boiling-range defined above. Accordingly, the class of feedstocks which may be utilized includes straight-run naphthas, natural naphthas, synthetic naphthas, cracked naphthas, partially reformed stocks, raffinates and paraffins streams from aromatic separation processes and the like. In addition, there are several narrow-cut, specialized streams that are good feedstocks to this process. The light paraffins stream from aromatics separation processes makes an excellent feedstock for the process of this invention. Paraffinic raffinate from an aromatic extraction process, and hexanes from an isomerization process are also excellent narrow cut feedstocks. The preferred feedstock comprises $C_6$-$C_8$ paraffins to take advantage of the ability of this catalyst to convert paraffins to aromatics. Another preferred feedstock comprises more than 70 weight % paraffins and naphthenes, based of the total weight of the feedstock. Some of the feedstocks may require pretreatment methods such as hydrotreating, hydrorefining, desulfurization, denitrogenation, hydrocracking, etc., to reduce the level of sulfur and/or nitrogen to a suitable level.

The improved sulfur tolerance of this catalyst allows operation under a wider variety of conditions. The catalyst does not deactivate as rapidly as the prior art L zeolite catalyst, but sulfur poisoning does affect the deactivation rate. Feedstock sulfur levels from 0.2 ppm to about 2 ppm are preferred. This makes it possible to run at feedstock sulfur levels of 1 or 2 ppm for short periods of time, such as during unit upsets upstream. However, operation of this process at sulfur levels above 1 ppm for long periods of time increase deactivation rates compared to sulfur free operation, and are not contemplated. Sulfur levels from 0.1 to 1 ppm are most preferred.

EXAMPLE I

This example shows the selectivity of Catalyst A, the prior art catalyst comprising type L zeolite exchanged with barium and potassium, a Group VIII noble metal, but no rhenium. Preparation of Catalyst A began with a commercially prepared potassium form of a type L zeolite. The barium exchanged form was prepared by adding 200 grams of the L zeolite to a solution made of 424.02 grams of barium nitrate in 5000 ml of distilled water. The solution was stirred and heated to about 165° F. for 3 hours. The solution was then cooled to room temperature and filtered. Excess barium was removed by reslurrying in 2000 ml of distilled water, heated to about 160° F. and stirred for 2 hours. The solution was filtered, and the filter cake was washed with an additional 4000 ml of distilled water. The BaK L Zeolite was dried overnight at 250° F., then calcined at 1000° F. for 12 hours. The BaK L Zeolite was analyzed to contain 9.7 weight % Ba, based on the total weight of the BaK L zeolite.

Platinum was added to the BaK L Zeolite by incipient wetness impregnation with an aqueous solution of tetraamine platinum (II) nitrate. The dried and calcined BaK L zeolite was ground to a 20 mesh size. A solution of 2.80 grams of tetraamine platinum (II) nitrate, $(NH_3)_4Pt(NO_3)_2$ dissolved in 110 cc of distilled water was used to impregnate 170.5 grams of the BaK L zeolite. The surface was dried under an infrared heat lamp for one hour. The catalyst was further dried in an oven at 250° F. overnight, and then calcined at 470° F. for three hours. The platinum loading was determined to be 0.64 weight %. The percentage exposed of platinum (dispersion) was determined by CO chemisorption to be 65%.

Catalyst A was tested in a fixed-bed, continuous flow quartz reactor at atmospheric pressure with $H_2$. The reactor was 1.4 cm I.D.×45 cm with an internal thermowell. Catalyst A was crushed to 14/20 mesh and 4.0 grams was loaded into the reactor. The hydrogen flow of 200 ml/min was controlled by a needle valve and measured at the outlet of the reactor. Hydrogen flow was established and the catalyst was pre-reduced for 30 minutes at 900° F. Normal hexane containing 1.3 ppm sulfur by weight was delivered by a syringe pump at 4.0 grams/hour. Reactor temperature was maintained at 850° F. at atmospheric pressure. The results of this test are shown in Table 1.

A second loading of Catalyst A was tested in the same apparatus under the same conditions, after pre-reducing the catalyst at 950° F. The results of this test are shown in Table 2.

TABLE 1

| Catalyst: Pt/BaK L | | | | | | | |
|---|---|---|---|---|---|---|---|
| Reduction temperature, °F.: 900 | | | | | | | |
| Feed: n-hexane (1.3 ppm S) | | | | | | | |
| WHSV = 1.0 hr$^{-1}$ | | | | | | | |
| Reaction time (min.) | 10 | 50 | 95 | 190 | 285 | 375 | 445 |
| Reaction products, wt % of feed | | | | | | | |
| $CH_4$ | 13.0 | 9.3 | 11.1 | 10.5 | 7.4 | 7.6 | 10.8 |
| $C_2H_6$ | 9.5 | 6.8 | 7.7 | 7.1 | 5.0 | 5.1 | 7.0 |
| $C_3H_8$ | 10.0 | 7.2 | 8.3 | 7.7 | 5.3 | 5.4 | 7.3 |
| $iC_4H_{10}$ | 1.3 | 0.7 | 0.7 | 0.6 | 0.4 | 0.4 | 0.6 |
| $nC_4H_{10}$ | 7.2 | 5.9 | 7.0 | 6.7 | 5.0 | 5.1 | 6.7 |
| $iC_5H_{12}$ | 2.0 | 1.5 | 1.5 | 1.3 | 1.0 | 1.0 | 1.1 |
| $nC_5H_{12}$ | 5.4 | 7.2 | 8.9 | 9.3 | 8.1 | 8.2 | 9.6 |
| $iC_6H_{14}$ | 2.1 | 5.5 | 7.3 | 8.6 | 9.0 | 9.2 | 9.2 |
| $nC_6H_{14}$ | 1.7 | 6.4 | 9.3 | 14.8 | 18.9 | 19.4 | 18.5 |
| Benzene | 47.5 | 49.2 | 38.0 | 33.3 | 39.8 | 38.5 | 29.2 |
| Toluene | 0.3 | 0.3 | 0.2 | 0.1 | 0.1 | 0.1 | — |
| Total hexane conversion | 96.2 | 88.1 | 83.4 | 76.6 | 72.1 | 71.4 | 72.3 |
| Benzene selectivity | 49.4 | 55.8 | 45.6 | 43.5 | 55.2 | 53.9 | 40.4 |

TABLE 2

Catalyst: Pt/BaK L
Reduction temperature, °F.: 950
Feed: n-hexane (1.3 ppm S)
WHSV = 1.0 hr$^{-1}$

| Reaction time (min.) | 10 | 35 | 60 | 100 | 160 | 200 | 240 | 305 |
|---|---|---|---|---|---|---|---|---|
| Reaction products, wt % of feed | | | | | | | | |
| $CH_4$ | 12.9 | 10.9 | 8.3 | 7.6 | 6.5 | 7.2 | 7.4 | 5.0 |
| $C_2H_6$ | 10.8 | 8.9 | 6.9 | 6.3 | 5.5 | 5.9 | 5.9 | 4.2 |
| $C_3H_8$ | 11.9 | 10.8 | 8.4 | 7.8 | 6.9 | 7.3 | 7.3 | 5.0 |
| $iC_4H_{10}$ | 1.2 | 0.9 | 0.7 | 0.6 | 0.5 | 0.5 | 0.5 | 0.3 |
| $nC_4H_{10}$ | 8.9 | 9.1 | 7.2 | 6.9 | 6.1 | 6.5 | 6.7 | 4.8 |
| $iC_5H_{12}$ | 2.3 | 2.0 | 1.5 | 1.3 | 1.1 | 1.1 | 1.1 | 0.8 |
| $nC_5H_{12}$ | 4.7 | 9.6 | 8.9 | 9.6 | 8.9 | 9.3 | 8.5 | 7.5 |
| $iC_6H_{14}$ | 0.3 | 6.6 | 8.4 | 10.9 | 11.6 | 12.1 | 12.3 | 11.6 |
| $nC_6H_{14}$ | — | 1.8 | 3.9 | 8.0 | 12.2 | 13.5 | 15.8 | 18.2 |
| Benzene | 46.7 | 39.2 | 45.6 | 40.8 | 40.5 | 36.5 | 34.4 | 42.5 |
| Toluene | 0.3 | 0.2 | 0.2 | 0.2 | 0.2 | 0.1 | 0.1 | 0.1 |
| Total hexane conversion | 99.7 | 91.6 | 87.7 | 81.1 | 76.2 | 74.4 | 71.9 | 70.2 |
| Benzene selectivity | 46.7 | 42.8 | 52.0 | 50.3 | 53.1 | 49.1 | 47.8 | 60.5 |

Pt/BaK L zeolite was tested twice for conversion of N-hexane to benzene. In one test the catalyst was pre-reduced at 900° F.; while in the other the catalyst was pre-reduced at 950° F. Neither the activity, stability, nor selectivity was affected by the reducing temperature. Initially the hexane conversion was near 100%, but decreased with time. The benzene selectivity at these reaction conditions was approximately 50%. The tests were completed when the hexane conversion dropped to 70%. The two tests on Pt/BaK L zeolite were virtually identical. At both reduction temperatures, the benzene selectivity was 50% and the catalyst experienced rapid deactivation rate.

EXAMPLE II

This example demonstrates the catalyst and process of this invention, Pt/Re on BaK L zeolite. Catalyst B was prepared by the impregnation of rhenium onto the finished Pt/BaK L Zeolite catalyst (Catalyst A) by incipient wetness of $NH_4ReO_4$. A rhenium solution was made by dissolving 0.15 grams $NH_4ReO_4$ in 20 ml distilled water. About half of the rhenium solution was added to 10 grams of Catalyst A. The surface of the catalyst was dried with a heat lamp to remove excess water, then the remainder of the rhenium solution was added. The catalyst was dried overnight at room temperature, further dried at 250° F. for two hours, and calcined at 450° F. for two hours. The rhenium/platinum ratio was determined to be 1.11 by weight. Test results for this catalyst are shown in Table 3.

TABLE 3

Catalyst: Pt Re/BaK L
Reduction temperature, °F.: 950
Feed: n-hexane (1.3 ppm S)
WHSV = 1.0 hr$^{-1}$

| Reaction time (min.) | 10 | 45 | 80 | 120 | 165 | 240 | 330 |
|---|---|---|---|---|---|---|---|
| Reaction products, wt % of feed | | | | | | | |
| $CH_4$ | 6.2 | 5.2 | 5.1 | 5.6 | 4.6 | 4.0 | 3.9 |
| $C_2H_6$ | 4.5 | 3.6 | 3.5 | 3.8 | 3.1 | 2.6 | 2.4 |
| $C_3H_8$ | 4.8 | 4.1 | 3.9 | 4.3 | 3.5 | 3.1 | 2.9 |
| $iC_4H_{10}$ | 0.5 | 0.4 | 0.4 | 0.4 | 0.3 | 0.3 | 0.2 |
| $nC_4H_{10}$ | 2.9 | 2.9 | 2.9 | 3.4 | 2.9 | 2.6 | 2.6 |
| $iC_5H_{12}$ | 0.6 | 0.7 | 0.8 | 0.9 | 0.7 | 0.7 | 0.7 |
| $nC_5H_{12}$ | 0.6 | 1.1 | 1.5 | 2.0 | 1.9 | 2.2 | 2.4 |
| $iC_6H_{14}$ | — | — | — | — | 0.1 | 0.1 | 0.2 |
| $nC_6H_{14}$ | — | — | — | — | — | — | — |
| Benzene | 79.6 | 81.8 | 81.7 | 79.4 | 82.7 | 84.2 | 84.5 |
| Toluene | 0.3 | 0.2 | 0.2 | 0.2 | 0.2 | 0.2 | 0.2 |
| Total hexane conversion | 100 | 100 | 100 | 100 | 99.9 | 99.9 | 99.8 |
| Benzene selectivity | 79.6 | 81.8 | 81.7 | 79.4 | 82.7 | 84.2 | 84.5 |

Pt/Re/BaK L zeolite was also reduced at 950° F. and reacted with n-hexane under identical conditions as Pt/BaK L zeolite. Although the same products were obtained, they are in different proportions than with the rhenium-free catalyst. With Pt/Re/BaK L zeolite, the benzene selectivity was 80%, compared to 50% in Example I. In addition the conversion of hexane remained 100% throughout the experiment, despite the 1.3 ppm S in the hexane feedstock.

EXAMPLE III

This comparative example shows the results of the prior art non-zeolite catalyst, Pt/Al$_2$O$_3$, designated Catalyst C. It is often used commercially because of its good activity, selectivity, and tolerance to sulfur. As a comparison, a commercial platinum on chlorided alumina catalyst was purchased from a commercial vendor. The catalyst contained 0.71 weight % Pt and 0.89 weight % chloride based on the total weight of the catalyst. Results of tests with this catalyst are shown in Table 4.

TABLE 4

Catalyst: Pt/Cl—Al$_2$O$_3$
Reduction temperature, °F.: 950
Feed: n-hexane (1.3 ppm S)
WHSV = 1.0 hr$^{-1}$

| Reaction time (min.) | 10 | 40 | 80 | 125 |
|---|---|---|---|---|
| Reaction products, wt % of feed | | | | |
| $CH_4$ | 12.7 | 8.0 | 6.6 | 6.0 |
| $C_2H_6$ | 10.5 | 7.2 | 6.2 | 5.9 |
| $C_3H_8$ | 14.9 | 10.0 | 8.5 | 7.9 |
| $iC_4H_{10}$ | 3.7 | 2.7 | 2.4 | 2.3 |
| $nC_4H_{10}$ | 11.8 | 8.7 | 7.6 | 7.0 |
| $iC_5H_{12}$ | 8.1 | 6.4 | 5.4 | 4.9 |
| $nC_5H_{12}$ | 8.0 | 7.8 | 6.3 | 5.9 |
| $iC_6H_{14}$ | 5.0 | 15.7 | 22.3 | 25.1 |
| $nC_6H_{14}$ | 0.6 | 4.2 | 6.8 | 8.4 |
| Benzene | 24.2 | 28.6 | 27.2 | 25.9 |
| Toluene | 0.5 | 0.7 | 0.7 | 0.7 |
| Total hexane conversion | 94.4 | 80.1 | 70.9 | 66.5 |
| Benzene selectivity | 25.6 | 35.7 | 38.4 | 38.9 |

The commercial Pt-Cl/alumina catalyst was evaluated under identical conditions as the two previous examples. The selectivity to benzene was considerably lower than either L zeolite catalyst, about 35%. Initially the catalyst had high activity for hexane conversion, but the conversion level dropped more rapidly than the L zeolite catalysts.

EXAMPLE IV

This example demonstrates the activity and selectivity of an unsulfided commercial Pt/Re on alumina catalyst. Four grams of a commercially prepared Pt/Re/alumina catalyst, Catalyst D, was loaded into the reactor described in Example I. American Cyanamid analysis of the catalyst reports that it contained 0.39 wt % Pt, 0.42 wt % Re, 0.92 wt % Cl, and the balance alumina, based on the total weight of the catalyst. The catalyst was reduced in hydrogen for about 30 minutes at 900° F., and brought to a reactor temperature of 850° F. at atmospheric pressure. The n-hexane feed containing 1.3 ppm S was feed through the unit at 4.0 grams per hour. Activity and selectivity data are shown in Table 5.

TABLE 5

Catalyst: Pt/Re/Cl—$Al_2O_3$ (unsulfided)
Reduction temperature, °F.: 900
Feed: n-hexane (1.3 ppm S)
WHSV = 1.0 hr$^{-1}$

| Reaction time (min.) | 10 | 45 | 180 |
|---|---|---|---|
| Reaction products, wt % of feed | | | |
| $CH_4$ | 4.8 | 3.7 | 2.8 |
| $C_2H_6$ | 3.9 | 3.4 | 2.9 |
| $C_3H_8$ | 4.3 | 3.6 | 2.9 |
| $iC_4H_{10}$ | 2.5 | 2.2 | 1.9 |
| $nC_4H_{10}$ | 4.1 | 3.4 | 2.8 |
| $iC_5H_{12}$ | 3.9 | 3.0 | 2.4 |
| $nC_5H_{12}$ | 4.0 | 3.1 | 2.3 |
| $iC_6H_{14}$ | 29.6 | 34.8 | 38.3 |
| $nC_6H_{14}$ | 11.7 | 17.7 | 23.6 |
| Benzene | 30.3 | 23.7 | 19.8 |
| Toluene | 0.9 | 0.4 | 0.3 |
| Total hexane conversion | 58.7 | 47.5 | 38.1 |
| Benzene selectivity | 51.6 | 45.1 | 51.9 |

The unsulfided conventional Pt/Re catalyst of this example shows low activity compared to the Pt/alumina at about the same deactivation rate. Unsulfided Pt/Re is not used commercially.

EXAMPLE V

The same catalyst as that used in Example IV, Catalyst D, was again loaded into the test apparatus described in Example I. Four grams of the catalyst was used. The catalyst was heated to 900° F. in hydrogen, then switched to a mixture containing 500 ppm $H_2S$ in hydrogen. The sulfiding was continued until sulfur was detected at the outlet of the reactor. The reactor was purged with hydrogen for 15 minutes. The temperature was lowered to reaction temperature, 850° F., and the hexane feedstock was introduced at a rate of 4.0 grams per hour. All other conditions were the same as in Example I. Data from the test of this catalyst are shown in Table 6.

TABLE 6

Catalyst: Pt/Re/Cl—$Al_2O_3$ (sulfided)
Reduction temperature, °F.: 900
Feed: n-hexane (1.3 ppm S)
WHSV = 1.0 hr$^{-1}$

| Reaction time (min.) | 10 | 40 | 105 |
|---|---|---|---|
| Reaction products, wt % of feed | | | |
| $CH_4$ | 0.7 | 0.7 | 0.8 |
| $C_2H_6$ | 5.6 | 4.6 | 4.1 |
| $C_3H_8$ | 6.1 | 4.9 | 4.6 |
| $iC_4H_{10}$ | 7.4 | 5.6 | 4.4 |
| $nC_4H_{10}$ | 5.1 | 3.8 | 3.3 |
| $iC_5H_{12}$ | 2.1 | 1.6 | 1.4 |
| $nC_5H_{12}$ | 1.1 | 0.9 | 0.8 |
| $iC_6H_{14}$ | 44.0 | 45.9 | 46.3 |
| $nC_6H_{14}$ | 16.3 | 16.1 | 16.8 |
| Benzene | 11.2 | 14.9 | 17.2 |
| Toluene | 0.4 | 0.4 | 0.3 |
| Total hexane conversion | 39.7 | 37.4 | 36.9 |
| Benzene selectivity | 28.2 | 39.8 | 46.6 |

The sulfided Pt/Re on alumina catalyst, as commercially used, gives much different results. The catalyst activity, as measured by the hexane conversion, starts at a much lower level compared to the unsulfided catalyst, but there is virtually no deactivation over the duration of the test. This shows the commercial advantage of this catalyst, its long life. The sulfided catalyst shows the same selectivity to benzene as the Pt catalyst of Example IV.

Comparing the hexane conversion and benzene selectivity data in Tables 1-6 shows that the process of this invention, Example II, is superior to both conventional reforming catalysts (Examples III, IV, and V) and the prior art L Zeolite catalysts. Even at a markedly higher selectivity, the catalyst has higher activity and better stability than any of the prior art catalysts. None of the other catalysts shows as high selectivity to benzene, nor the high activity level which is maintained through the test period.

We claim:

1. A reforming catalyst formed by a process comprising calcining at less than 550° F. an unsulfided Zeolite L component having cationic sites ion exchanged with at least one member selected from the group consisting of potassium and barium; said catalyst further comprising a Group VIII noble metal component and a rhenium component; said rhenium component being incorporated onto the Zeolite L by impregnation with a rhenium-containing solution; where the ratio of the noble metal component to the rhenium component is from about 0.1:1 to about 10:1.

2. The catalyst of claim 1, wherein said Group VIII noble metal component comprises platinum or palladium.

3. The catalyst of claim 1, wherein said catalyst comprises from about 0.3 to about 2.5 weight percent of the Group VIII Noble Metal based on the weight of the L zeolite.

4. The catalyst of claim 1 wherein a binder is added to said catalyst.

5. A method of claim 1 wherein said rhenium-containing solution comprises perrhenic acid.

* * * * *